SEARCH ROOM
15272E
92
X5398T
T2660
X266
X3345
X3434

May 23, 1961 D. D. GRIEG ET AL 2,985,754

FREQUENCY RESPONSIVE TRANSMITTER-RECEIVER SYSTEM

Filed May 4, 1946 3 Sheets-Sheet 1

INVENTORS
DONALD D. GRIEG
RALPH B. READE
BY
R P Morris
ATTORNEY

FRENQUENCY RESPONSIVE TRANSMITTER-RECEIVER SYSTEM

Filed May 4, 1946 3 Sheets-Sheet 2

INVENTORS
DONALD D. GRIEG
RALPH B. READE
BY
R P Morris
ATTORNEY

INVENTORS
DONALD D. GRIEG
RALPH B. READE
BY
R P Morris
ATTORNEY

United States Patent Office 2,985,754
Patented May 23, 1961

2,985,754

FREQUENCY RESPONSIVE TRANSMITTER-RECEIVER SYSTEM

Donald D. Grieg, Forest Hills, and Ralph B. Reade, Larchmont, N.Y., assignors to International Telephone and Telegraph Corporation, a corporation of Maryland Filed May 4, 1946, Ser. No. 667,261

18 Claims. (Cl. 250—17)

This invention relates to methods and means for preserving a given frequency and more particularly to a system for storing information regarding the frequency of a signal for short or long periods of time depending on whether driving frequency is or is not present.

In certain applications of the radio communications art, as for instance, when monitoring or jamming enemy stations, it is sometimes necessary to quickly follow changes of the signal frequency of the enemy transmitter and to preserve or carry over information of the last available frequency for periods during which, for instance, the enemy interrupts this transmission. Information regarding the enemy signal frequency may then be utilized in diverse ways including indication or utilization of the information for controlling the operative functions of apparatus associated therewith as for continuous jamming.

It is an object of the present invention to provide a system for storing frequency information for short and for comparatively long periods of time depending on the presence of the signal frequency.

It is another object to provide a system for storing information regarding frequency for short periods of time when signal frequency is present and for substantially indefinitely long periods of time when such signal frequency is absent.

A still further object is to provide a system for storing information regarding an extraneous signal frequency for short and long periods depending on the presence of such frequency, which information may be utilized for controlling the frequency of apparatus associated therewith.

Another object is to provide a system of the above type which operates over a given band of frequencies any one of which frequencies may be stored in accordance with the objects set forth above.

Still another object is to provide a system incorporating a frequency storage device in accordance with the above.

In accordance with the invention, we provide in connection with a source of various frequencies, a frequency discriminator of the type which converts changes in frequency into variations of voltage amplitude with which a circuit is associated adapted to utilize the varying amplitude voltages for the charging of a time-constant circuit. The time-constant circuit has a dual function, namely to provide a short time constant which permits the circuit to follow any changes in frequency of a signal from the source, and a comparatively long time constant which will preserve the signal frequency substantially indefinitely during absence of the signal frequency. The arrangement is such that information pertaining to the last available frequency will be preserved until a new signal is received. Circuit storing means have been provided for changing over from one to the other time constant in response to the presence of a signal. The voltages thus stored are capable of being made available for the use by voltage utilization circuits such as frequency modulators, which may operate oscillators or frequency indicating apparatus as desired. In accordance with certain other features of the invention, we provide a representative jamming circuit utilizing the stored frequency information for controlling the signaling frequency of an associated signal transmitter.

These and other objects and features of the invention will become more apparent upon consideration of the following detailed description of an embodiment to be read in connection with the accompanying drawings in which.

Figure 1:
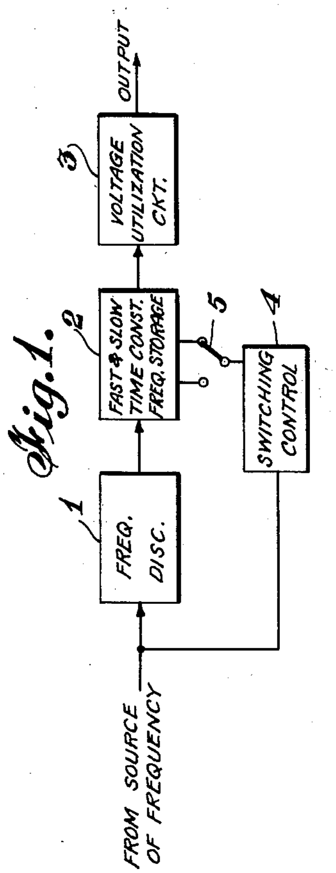
Fig. 1 is a diagram in block form illustrating the constituent portions of a frequency storage system in accordance with the invention.

Referring now to Fig. 1, a frequency discriminator 1 is being supplied from a source of signal frequencies which has not been indicated. The frequency discriminator may be of the type generally employed for converting variations in frequency into voltage amplitude modulations the details of which will not be gone into since the principles of such a discriminator are well known and need no further elaborations. The voltage amplitude modulations of the discriminator 1 are applied to a double time-constant circuit 2 for storage therein and may be released as desired therefrom for application to a voltage utilization circuit 3 which may be a frequency modulator or other translator as will be explained in detail hereinafter. A switching control circuit 4 has been provided to effect the changeover from one time constant to the other in response to the presence of a signal in the input circuit of the frequency discriminator 1. A switch for effecting the changeover from one time constant to the other is indicated at 5.

Figure 2:
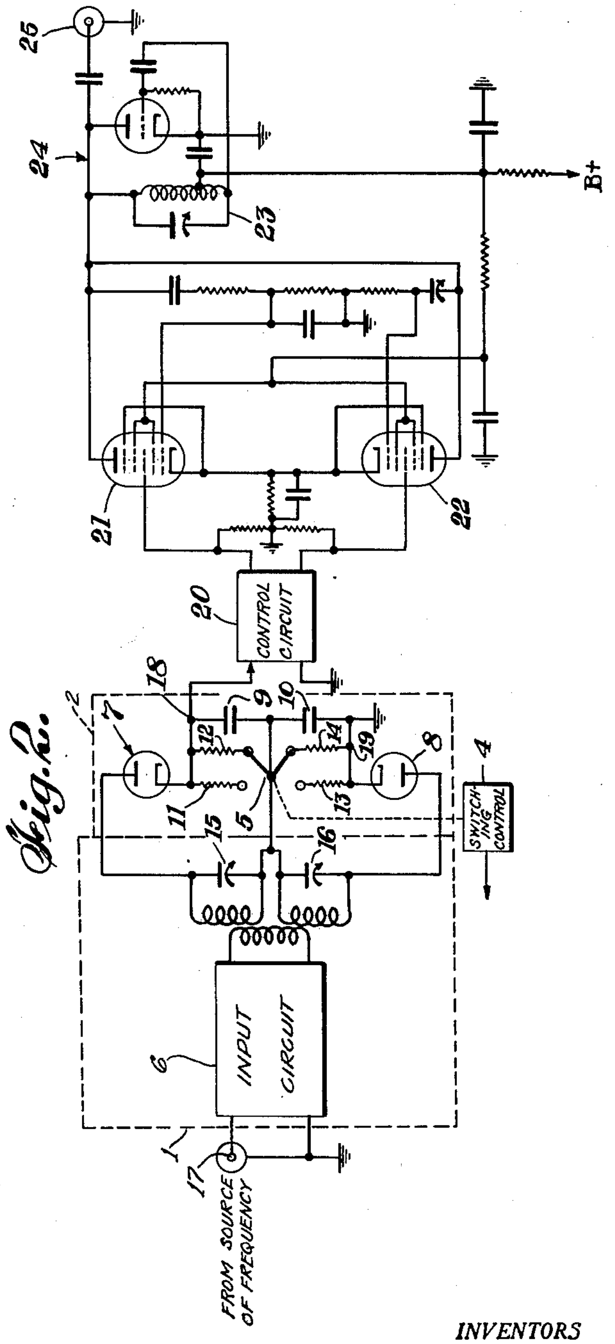
Fig. 2 is a diagram partly in block and partly in schematic form illustrating in detail an oscillator circuit controlled by a system in accordance with Fig. 1.

In the diagram of Fig. 2 the frequency discriminator 1 may comprise an input circuit 6 tuned to a given carrier frequency of the waves from the source 17 and two output circuits 15 and 16 tuned above and below the given carrier frequency respectively. The two output circuits provide alternating voltages having an amplitude varying in accordance with the frequency deviation from said given frequency of the waves from said source. After passage of the outputs of circuits 15 and 16 through the detectors 7 and 8 a differential direct voltage is developed across 9 and 10 having a polarity in accordance with the direction of said frequency deviation and an amplitude in accordance with the amount of deviation. The time-constant circuit 2 which is comprised of two diode rectifiers 7 and 8 connected in push-pull and each connected to charge similar double purpose time-constant circuits consisting of condensers 9 and 10, and resistances 11, 12 and 13, 14 respectively adapted to be connected in parallel with the condensers by means of switch means 5 and arranged in the cathode circuits of the two diodes respectively. The switch means 5 is operated or energized for operation from the switching control 4. Details of such a control, which may be mechanical or electronic, will be discussed in connection with Fig. 4. The resistance 11 is much greater than the resistance 12, the former being in fact, so large as to substantially represent an open circuit across the condenser 9 when switch 5 is in the position to connect it across the condenser 9. These two resistances then represent a fast and a slow time constant which become operative by means of the switch control 4 in response to the presence of a signal in the system. The fast time constant is thus operative during the presence of a signal while the slow time constant is normally available in place of the fast one when no signal is being translated. In this way the discriminator-detector circuits are able to follow rapidly the changes of an applied signal, while a so-called "remembering" circuit is utilized for carrying over information of the last available frequency when no signal is being received. The same considerations are applicable to the time constant represented by resistances 13, 14 and the condenser 10 associated with the rectifier 8. As energy at a given amplitude is being applied to the time-constant circuits the voltage in condensers 9 and 10 will build up to a given potential. During the presence of the signal, when the fast time constant is in circuit, that is when resistances 12 and 14 are connected across the respective condensers, leakage from the condensers will take place quite rapidly so that the effective voltages across the condensers are substantially instantaneously representative of the frequency applied. Thus, for every change in input voltage the condensers will assume a predetermined voltage charge. This charge, as the signal ceases and the switch means 5 is actuated to connect the slow time constant into the diode circuits, remains stored for comparatively long periods until such time as the signal again is present when the fast time constant is brought back into circuit again. The detector-time-constant circuits 2 are tuned by the rotation of adjustable condensers 15 and 16 in the output circuits of the discriminator 1. The voltages available in the two condensers 9 and 10 may be obtained across their outside terminals 18 and 19, the latter being grounded. These voltages, after their application to an intermediate control circuit 20 which may comprise a suitable form of coupling, are applied to the voltage utilization circuit 3. In this instance circuit 3 consists of reactance tubes 21 and 22 which are connected in push-pull and are in effect variable reactances or impedances forming part of the tank circuit 23 of an oscillator 24. The details of the conversion of an amplitude modulated voltage into frequency modulations by means of reactance tubes in the circuit of an oscillator need not be described in detail since their principles are well understood. The desired resultant frequency modulations, in accordance with the variations in voltage applied to the tubes 21 and 22 may be obtained at the oscillator output terminal 25. It is, of course, to be understood that the control circuit 20 may have other functions than the one of coupling circuits 2 and 3, such, for instance, as the modulation of the voltages obtained from circuit 2 in any desired manner, whereby a given output frequency may be obtained in response to the incoming frequency.

Figure 3:
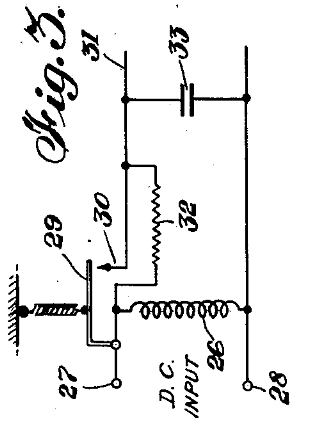
Fig. 3 is a schematic representation of an alternative form of frequency storage circuit.

In Fig. 3 an alternative system for storing the information in respect to the incoming frequency is illustrated which may be used in place of the circuit shown at 2 in Fig. 2. In this instance, an electromagnetic relay 26 is connected across input terminals 27 and 28. When energized by direct current, the relay 26 actuates an armature 29 to close on a contact 30 thereby establishing a direct connection between the terminal 27 and an output lead 31. The contact 30, when not closed, is by-passed by means of a resistance 32, the closed contact 30 providing a short circuit of the resistance 32. A condenser 33 is connected between the connection 31 and the terminal 28. The resistance 32, which is comparatively high, being the substantial equivalent of an open circuit, and the condenser 33 together form a slow time constant circuit, while, when the relay is energized, a fast time constant for rapid follow-up of any frequency changes is formed by the condenser 33 and the resistance of the coil 26. When the signal across the relay disappears, the high resistance 32 is in shunt across condenser 33 to thereby prevent discharge of the storage condenser 33 which is the normal condition for the circuit.

Figure 4:
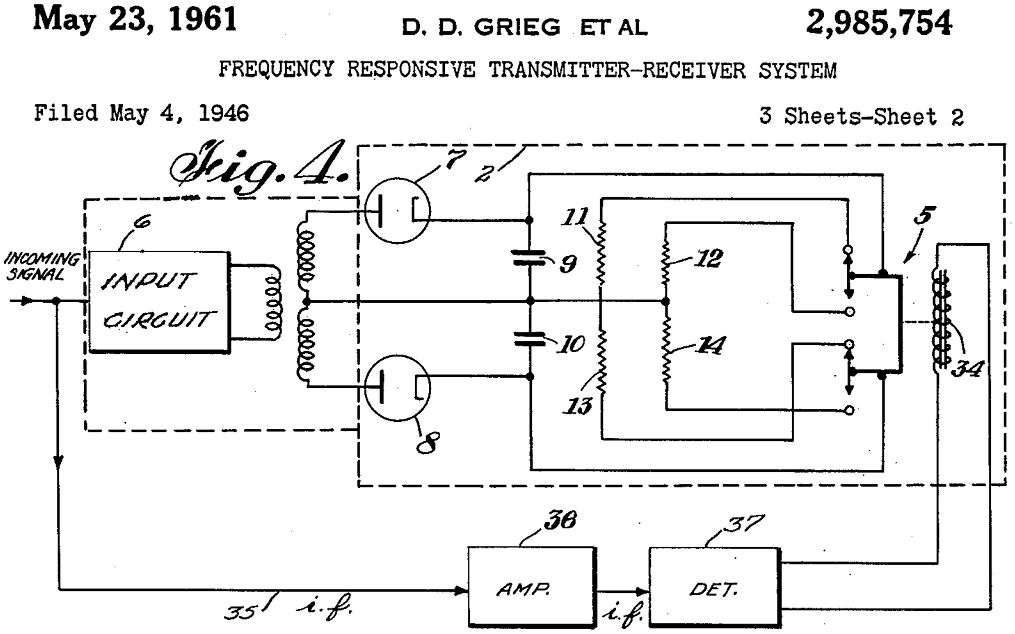
Fig. 4 is a schematic of a dual purpose time constant circuit for use with the circuit of Figs. 1 and 2.

Referring to Fig. 4, another relay control circuit is indicated in connection with the discriminator-detector circuit elements referred to in Fig. 2, including schematically the discriminator 1, the detectors 7 and 8, the time-constant circuits 9, 10, 11, 12, 13 and 14 and the switch means 5. The time-constant circuits are shown connected such that the long time constant including resistances 11 and 13 are normally connected across the condensers 9 and 10. The switch means 5, which is effective in changing over from the slow to the fast time constant, that is, by connecting resistances 12 and 14 across the condensers 9 and 10, is actuated by an electromagnetic relay 34. The relay 34, in turn, becomes energized by means of direct current which is obtained from the incoming signal as applied to the discriminator over a line 35, an I.F. amplifier 36 and a detector 37.

Thus, it will be apparent that the presence of the signal is effective in changing over from the slow to the fast time constant as already indicated. It will be also understood that in place of the electromagnetic relay 34 and the switch means 5, electronic means may be employed in accomplishing the result sought. Under any circumstances, however, the fast time constant must be sufficiently slow to permit the relay, whether mechanical or electronic to effect the changeover before the condensers 9 and 10 have the opportunity to become substantially discharged. As an example, the period of the fast time constant should be about .1 second in the case of a mechanical relay and .001 second in the case of an electronic switch. This consideration is important since otherwise the information regarding the last available frequency might be "lost" before the "memory" circuit takes over.

Figure 5:
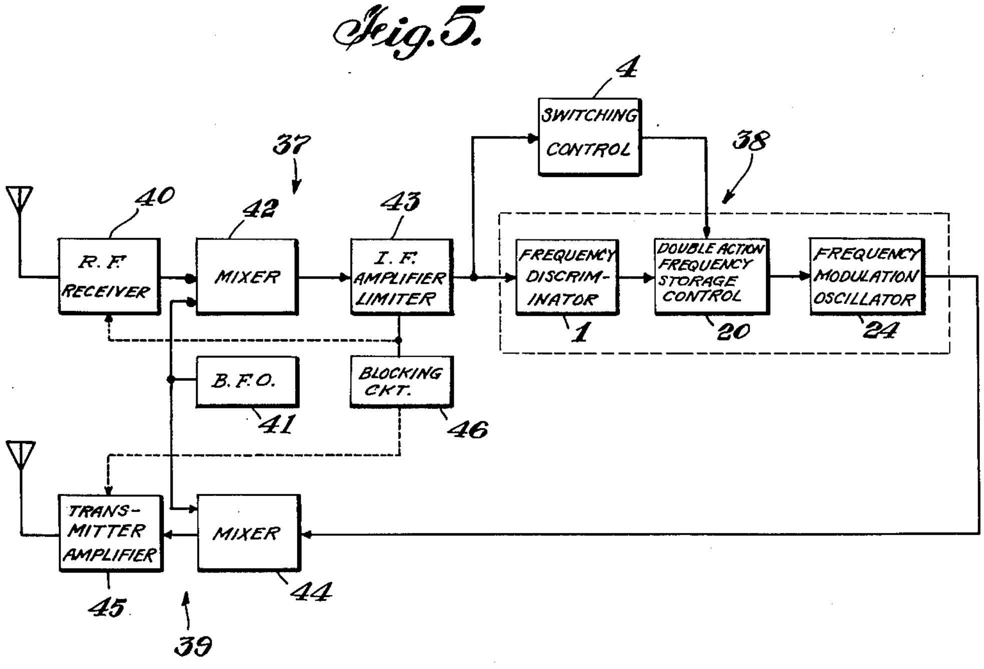
Fig. 5 is a diagram in block form illustrating a jamming circuit in accordance with the invention.

In Fig. 5, a jamming circuit is represented in block form which comprises a receiving portion 37, a frequency storage and control portion 38, and a transmitting portion 39. The receiving portion, in conformance with general practice for such apparatus, consists of a radio frequency receiver 40, the output of which is converted to an intermediate frequency by interaction with a beat frequency oscillator 41, the radio frequency and the oscillator frequencies being brought together in a mixer 42. The intermediate frequency thus obtained is amplified and limited to a uniform amplitude in a suitable circuit 43. The I.F. output is then applied to the frequency storage and control circuit 38 including the frequency discriminator 1, the double purpose frequency storage and control circuits 2 and 20, and the frequency modulation oscillator circuits 3 and 24 in accordance with the details of the circuits 3 and 24 of Fig. 2. The frequency storage circuits 2 and 20 are controlled in respect to their fast and slow time constants in reference to the presence of signals by means of the switching control 4. The output of the circuits 38 which substantially reproduces the frequency of the incoming signal at the intermediate frequency level is now applied to an output mixer circuit 44 wherein it is added to the beat frequency of the oscillator 41 to result in a transmitter output radio frequency which is amplified in the power amplifier 45 and which now substantially equals the original value of the incoming signal radio frequency. A blocking circuit 46 is provided to insure alternate operativeness of the receiver and transmitter portions of the system by supplying a suitable blocking potential to the R.F. and I.F. stages 42 and 43 of the receiver and to the transmitter amplifier 45 respectively.

Figure 6:
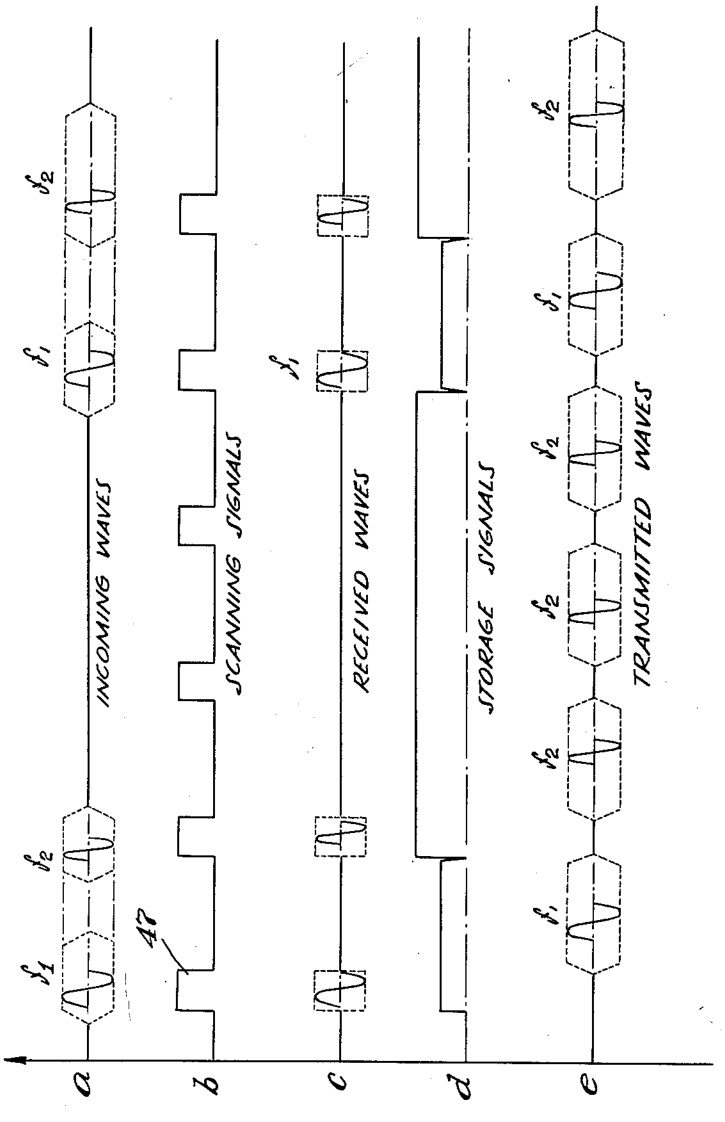
Fig. 6 is a series of graphs illustrating certain operating characteristics of the circuit of Fig. 4.

In Fig. 6, graphs *a* through *e* represent respectively in graph *a* the frequencies of the incoming signal referred to as $f_1$ and $f_2$, scanning cycles 47 for the receiver as provided by the blocking circuit 46, (*b*), the received signal during the scanning periods (*c*), the voltage amplitude levels of the frequency storage circuit corresponding to the two frequencies received during and intermediate the reception of a signal ($d$), and the signal frequencies of the transmitter as determined by the transmitter oscillator control circuits in response to the received frequencies ($e$).

From inspection of the drawings, particularly Fig. 2, it will be seen that the amplitude modulated voltages as obtained from the frequency discriminator in accordance with the frequencies cause, upon their appearance in the detector circuit 2, the diodes 7 and 8 to conduct whereby a charging of the condensers 9 and 10 takes place. The charging level in these condensers is naturally a function of the voltage and thereby of the frequency. Since the charge of the condensers is substantially an instantaneous one and their discharge also quite rapid because of the fast time constant when signal is present, the charge on the condensers at any time during reception is a direct measure of the applied voltage and of the received frequencies. As the signal ceases to be received, the slow time constant takes the place of the fast one with the result that the charge on the condensers remains substantially at the value corresponding to the last frequency. In practice, leakage is negligible as the slow time constant is equivalent to an open circuit so that the charge may be preserved substantially indefinitely within the practicability of design. As soon as another signal is received, such as that indicated by the frequency $f_2$ in graph $a$, Fig. 6, conductivity is again established across the diodes and the slow time constant is replaced by the fast one due to operation of the switch means 4. Since the frequency $f_2$ in this case is higher than $f_1$ the condensers will charge up to a higher level as compared to that due to $f_1$ (graph $d$). If, as suggested, the control circuit 20 of Fig. 2 is a coupling circuit, the voltages due to the charge on the condensers 9 and 10 will be applied directly to the control grids of the reactance tubes 21 and 22 to thereby vary the impedance of the tank circuit 23 and to influence the frequency of oscillation of the oscillator circuit 24. The control circuit 20, may, however, be used to impart a change to the voltage obtained from condenser 9 and 10 so that the oscillator may actually be tuned to a frequency other than that received. It will also be clear that in practice, the charge on the condensers which, of course, means the information as to the frequency of the received signal may be preserved until such time as a use for it may be found. Such uses may include direct frequency indication, monitoring as well as automatic tuning of associated apparatus and any other desired function. This information in respect to the frequency will be preserved until another signal has been received with the result that the charge of the condensers follows up or down to a level proportionate to the new frequency from the level acquired by previous signals.

In the embodiment of the frequency storage device or memory circuit shown in Fig. 3, the incoming signal energizes the relay 26 whereby a charge is applied to the condenser 33 over the closed contact 30, the charge being proportionate to the frequency. As the signal ceases to be applied, the relay armature 29 opens and the charge on condenser 33 remains thereon except for that portion leaking off through the resistance 32 which is sufficiently high to make such leakage quite low. The amplitude storage device changes the output amplitude in unison with the input amplitude, and in addition the output amplitude is maintained at the same amplitude as the last input voltage if this voltage is removed. Instead of being applied to a transmitter, the resultant output frequency of the oscillator circuit 20 may, of course, also be used for direct indication of the received frequency after a practicable lapse of time within the limit of the constants of the storage circuit 2. Other applications of the storage frequency information will occur to those skilled in the art.

While the above is a description of the principles of this invention in connection with specific apparatus, it is to be clearly understood that this description is made only by way of example and not as a limitation on the scope of this invention as defined in the accompanying claims.

We claim:

1. A system for use with a source of waves for electrically preserving for given periods of time information in respect to the frequency of said waves, comprising means for deriving a signal having an amplitude which is characteristic of the frequency of said waves, means coupled to said first named means for storing for a desired period energy proportional and in response to said signal amplitude, and means for changing the time characteristic of said storing means in response to a second signal derived from said source of waves.

2. A system according to claim 1, wherein said deriving means comprises a frequency discriminator for converting frequency variations of said waves into corresponding amplitude variations.

3. A system according to claim 1, wherein said energy storing means includes detector circuit means and a double purpose time-constant circuit having a slow and a fast characteristic.

4. A system according to claim 1, wherein said energy storing means includes detector circuit means and a double purpose time-constant circuit having a slow and a fast characteristic, said time-constant circuit comprising electrostatic storage means and comparatively low and high resistance means adapted to be connected across said storage means.

5. A system according to claim 1, wherein said changing means comprises switch means for said storing means.

6. A system according to claim 1, wherein said means for deriving comprises a frequency discriminator providing two differential direct voltages, said storing means includes two double purpose time-constant circuits, means for applying each of said voltages to a respective time constant circuit each time constant circuit comprising a condenser and a low and a high value resistance, and said changing means comprising a mechanical switch for selectively connecting said resistances across said condenser.

7. A system for use with a source of waves for electrically preserving for given periods of time information in respect to the frequency of said waves, comprising a frequency discriminator for converting frequency variations of said waves into corresponding direct voltage amplitude variations having a different polarization in accordance with the direction of the frequency deviation of said waves from a given frequency, a pair of double purpose time-constant circuits, means for applying each different polarized voltage to a separate time constant circuit, said time constant circuits having alternative slow and fast characteristic circuit elements, and switch means connected to be energized by a signal derived from said source of waves for effecting a changeover of said time-constant circuit from the slow to the fast characteristic upon the appearance of a wave of a given intensity.

8. A system for use with a source of waves for electrically preserving for given periods of time information in respect to the frequency of said waves, comprising means for deriving from said waves a signal having an amplitude which is characteristic of the frequency of said waves, means coupled to said first named means for storing energy having a voltage proportional to said amplitude for given periods, means for changing the storage time characteristic of said storing means in response to the appearance of a control signal in the system, and a voltage utilization circuit operatively associated with said storing means.

9. A system according to claim 8, in which said voltage utilization circuit comprises a frequency modulation circuit.

10. A system according to claim 8, in which said storing means includes a double purpose time-constant circuit.

11. A system for electrically utilizing after given periods of time information in respect to the frequency of waves from a source, comprising a frequency discriminator to provide a signal varying in amplitude with variation in frequency of the waves, a time-constant circuit coupled to said discriminator having two alternative storage time characteristics, switch means to change said storage time characteristic upon the appearance of a signal in the system, a reactance tube circuit coupled to said time-constant circuit for utilization of the storage voltage thereof, and an oscillator circuit operatively associated with said reactance tube circuit for control of the oscillator circuit output frequency thereby.

12. A system according to claim 11, in which said frequency discriminator includes two separate diode detectors for providing two signals polarized differently in accordance with the direction of frequency deviation of said waves and having an amplitude in accordance with the amount of deviation from a given frequency.

13. A system for automatically tuning the frequency of a transmitter in response to that of a received signal, comprising means for receiving signals having various frequencies, means to limit the amplitude of the received signals to a given constant value, a frequency discriminator circuit for said amplitude limited signals, means for storing for given alternative periods signal energy indicative of the frequency of the received signal as obtained from said discriminator, switch means for changing the storage characteristic of said storing means from one to the other upon the appearance of a signal in the system, a frequency modulation oscillator operatively coupled to said storing means for utilizing the storage voltage thereof, means for transmitting the output of said oscillator, and circuit means for alternately enabling said receiving and said transmitting means.

14. A time-constant system comprising means for storing electrical energy having two alternative storage characteristics, means for applying energy to said storage means, means controlling the conductivity from said energy applying means to said storing means in response to applied energy, and means for effecting a changeover of said storing means in respect to the storage characteristics in response to the presence of a signal.

15. A system according to claim 14, in which said storing means comprises a double purpose electrostatic time-constant circuit.

16. A system according to claim 14, in which said controlling means comprises a push-pull diode rectifier circuit.

17. A system according to claim 14, in which said controlling means comprises an electromagnetic contact relay.

18. A system according to claim 14, wherein said storing means includes elements for providing a slow and fast storage time characteristic, and said change effecting means includes relay switch means normally connected to provide a slow storage time, further including means for energizing said relay switch means upon appearance of signal energy whereby a changeover to the fast storage time is effected.

References Cited in the file of this patent

UNITED STATES PATENTS

| | | |
|---|---|---|
| 1,663,086 | Long | Mar. 20, 1928 |
| 2,218,642 | Hathaway | Oct. 22, 1940 |
| 2,284,266 | De Bellescize | May 26, 1942 |